(12) United States Patent
Smith et al.

(10) Patent No.: US 7,643,467 B2
(45) Date of Patent: Jan. 5, 2010

(54) SOURCE-IMPLEMENTED CONSTRAINT BASED ROUTING WITH SOURCE ROUTED PROTOCOL DATA UNITS

(75) Inventors: Peter Ashwood Smith, Hull (CA); Ryan Stark, Ottawa (CA); Donald Fedyk, Groton, MA (US)

(73) Assignee: Nortel Networks Limited, St. Laurent, Quebec (*) Notice: Subject to any disclaimer, the term of this patent is extended or adjusted under 35 U.S.C. 154(b) by 654 days.

(21) Appl. No.: 10/745,886

(22) Filed: Dec. 23, 2003

(65) Prior Publication Data

US 2005/0135330 A1 Jun. 23, 2005

(51) Int. Cl.
*H04L 12/28* (2006.01)
(52) U.S. Cl. .......... 370/351; 370/338; 370/356
(58) Field of Classification Search .......... 370/351, 370/238, 60, 353, 229, 331, 338; 709/238, 709/223, 230
See application file for complete search history.

(56) References Cited

U.S. PATENT DOCUMENTS

| | | | | |
|---|---|---|---|---|
| 5,566,170 A * | 10/1996 | Bakke et al. | | 370/392 |
| 5,737,328 A * | 4/1998 | Norman et al. | | 370/331 |
| 6,950,398 B2 * | 9/2005 | Guo et al. | | 370/235 |
| 6,985,959 B1 * | 1/2006 | Lee | | 709/238 |
| 7,143,288 B2 * | 11/2006 | Pham et al. | | 713/165 |
| 7,185,266 B2 * | 2/2007 | Blightman et al. | | 714/776 |
| 7,191,241 B2 * | 3/2007 | Boucher et al. | | 709/230 |
| 7,203,761 B1 * | 4/2007 | Rai et al. | | 709/238 |
| 7,209,448 B2 * | 4/2007 | Oskouy et al. | | 370/238 |
| 2004/0042406 A1 * | 3/2004 | Wu et al. | | 370/238 |

OTHER PUBLICATIONS

A Review of Current Routing Protocols for Ad Hoc Mobile Wireless Networks, Elizabeth M. Royer, university of California, Santa Barbara, 1999 IEEE.*
DSR: The Dynamic Source Routing Protocol for Multi-Hop Wireless Ad Hoc Networks, David B. Johnson, David A. Maltz, Josh Broch, Computer Science Department, Carnegie Mellon University, http://www.monarch.cs.edu.*
Tel 316; Data Network Design "What is Inside a router?" http://web.archive.org/web/20010506185155/http://www.tele.sunyit.edu/Router_inside.htm.*

* cited by examiner

*Primary Examiner*—Ricky Ngo
*Assistant Examiner*—David Oveissi
(74) *Attorney, Agent, or Firm*—Anderson Gorecki & Manaras

(57) ABSTRACT

Source-implemented constraint-based routing with source routing enables traffic engineering to be performed and reservations to be made within a domain without requiring constraint information and reservation information to be disseminated to all nodes in the domain. In one embodiment, a focal node maintains a table containing metrics of links and connection reservations through the domain. When a connection is to be added, the focal node determines a path, given the constraints reflected in the table, and allocates resources on the links forming the path. The table is updated, and the path is used to generate headers for traffic associated with the connection. Traffic from the nodes toward the focal point follow the reverse path. If a node or link fails, connections carried through the failure are identified, reservations on links associated with the connections are released, and new reservations are made taking into account the new network topology.

16 Claims, 4 Drawing Sheets

SOURCE-IMPLEMENTED CONSTRAINT BASED ROUTING WITH SOURCE ROUTED PROTOCOL DATA UNITS

BACKGROUND OF THE INVENTION

1. Field of the Invention

The present invention relates to communication networks and, more particularly, to a method and apparatus for source implemented constraint based routing with source routed protocol data units.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/ bytes of data, between the network elements by utilizing one or more communication links between the devices. A particular protocol data unit may be handled by multiple network elements and cross multiple communication links as it travels between its source and its destination over the network.

There exists a class of networks in which traffic patterns are very focused. In particular, the traffic in these networks generally flows either from a well known focal point out to all the other nodes, or the reverse, from all those nodes back to the focal point. In these networks rarely, if ever, does traffic flow in any other pattern. One example of a network that generally exhibits these characteristics is a wireless ad-hoc network containing a network of wireless routers spanning a neighborhood and providing wireless access to individual users in the neighborhood, although the invention is not limited to an implementation in this particular type of network.

FIG. 1 illustrates a network in which a focal point F acts as an interface between a group of network elements interconnected in a mesh network configuration. The network elements may be wireless access devices or other types of network elements. Within the mesh, the network elements are typically homogenous devices having approximately equal capacity. For example, the network elements may be wireless routers configured to transmit wireless signals using a particular protocol. Since the protocol defines the transmission bandwidth available over a given link between adjacent nodes, the network elements in this instance are practically limited to the protocol definition regardless of their physical capabilities.

Because of the focal-point in the network, traffic will congest on links adjacent the focal point if a shortest path routing protocol is used, such as Open Shortest Path First (OSPF) or Routing Information Protocol (RIP). This is especially true when traffic patterns are not well balanced.

To overcome this problem, it is necessary to apply constraint based routing to allow full use of the network while minimizing congestion. Several protocols have been developed to do constraint based routing. For example, OSPF-Traffic Engineering (OSPF-TE) and MultiProtocol Label Switching-Traffic Engineering (MPLS-TE) both have been developed to determine constraint-based paths through the network and enable reservations to be made on the network. Specifically, with OSPF-TE and MPLS signaling, each node on the network maintains a table of links and constraints on the links. Thus, when a new connection is to be added to the network, the connection is signaled on the network and a new path is determined for the connection. Once the new path is determined, the path is signaled with PATH/RESV messages according to the MPLS protocol. Finally, OSPF-TE re-floods the new available bandwidth on the traversed links after admission control completes at each of the intermediate nodes on the path.

Unfortunately, any time a reservation is made or altered in OSPF-TE or one of the other traffic engineering protocols, a link state advertisement (LSA) must be broadcast on the network to enable other nodes on the network to update their topology map with the new reservation information. Flooding of LSAs is acceptable on a network having a small number of nodes and links, however it can become onerous where the network becomes quite large. Additionally, where the links are of limited bandwidth, such as in the wireless area, using a portion or potentially a relatively large portion of that bandwidth to communicate LSAs between the nodes is an undesirable proposition.

SUMMARY OF THE INVENTION

The present invention overcomes these and other drawbacks by providing a method and apparatus for source-implemented constraint-based routing with source routed protocol data units in a communication network. According to an embodiment of the invention, traffic engineering within a domain may be performed by causing traffic subject to traffic engineering to pass through a focal node in the domain and implementing constraint based routing at the focal node. Implementing constraint based routing at the focal node eliminates the need to disseminate constraint information, for example through the dissemination of link state advertisements, to the other nodes in the domain. Use of source routed protocol data units enables the focal node to control routing of protocol data units on the domain without requiring the dissemination of path reservations on the domain.

According to an embodiment of the invention, the focal node maintains a link state table containing metrics of links and connection reservations through the domain. When a connection is to be added on the domain, the focal node determines a path given the constraints reflected in the link state table, allocates the connection to the path, and updates the link state table. This path is affiliated with the connection in a connection table, and is used to generate headers for protocol data units associated with the connection. The protocol data unit headers convert the protocol data units into source routed packets that contain path information to enable the packets to be routed through the domain. Traffic from a target node toward the focal point follows the same path established from the focal node to the target node. If a node or link fails, connections established through the failing node or link are identified, reservations on other links for those connections are released, and the new reservations are made for the connections (if possible) taking into account the new network domain topology.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
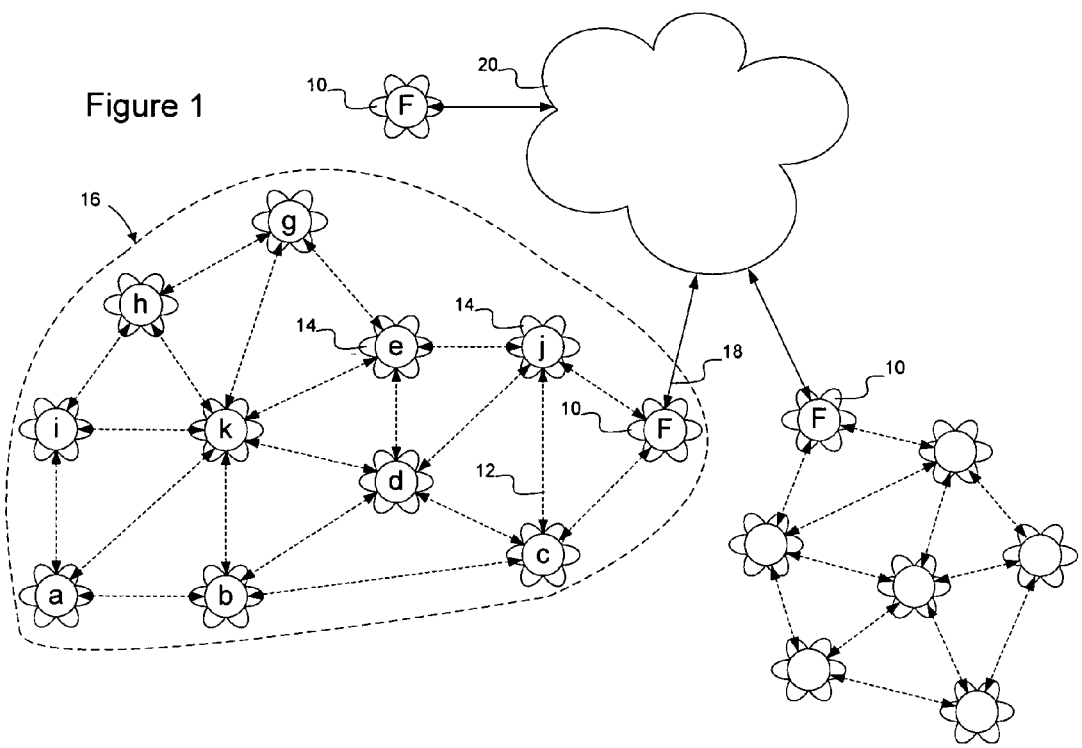
FIG. 1 is a functional block diagram a portion of an example communication network.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, traffic engineering within a domain may be performed by causing traffic subject to traffic engineering to pass through a focal node in the domain and implementing constraint based routing at the focal node for that traffic. Implementing constraint based routing at the focal node eliminates the need to disseminate constraint information, for example through the dissemination of link state advertisements, to the other nodes in the domain. Use of source routed protocol data units enables the focal node to control routing of protocol data units on the domain without requiring the dissemination of path reservations on the domain.

According to an embodiment of the invention, the focal node maintains a link state table containing resource allocations of links and connection reservations through the domain. The resource allocations may relate to any type of value associated with the link. For example, the focal node may keep track of bandwidth, power, distance, impairments, any combination of these and other values, or may maintain a table of unitless values configured to enable the focal node to balance use of the links. For example, in an IP/TCP network, the TCP protocol will speed up/down depending on the link congestion/loss. Balancing the use of the links, using whatever values/units are chosen to implement the resource allocation, enables the congestion to be dispersed so that end applications are able to obtain similar throughput on the network. The invention is thus not limited to the particular type of values or units used to keep track of link usage. As used herein, the term "metric" will be used generically to refer to any value, unit, parameter, or other indicia usable to perform resource allocation.

When a connection is to be added on the domain, the focal node determines a path given the constraints reflected in the link state table and allocates bandwidth or another metric on the links forming the path. This path is affiliated with the connection in a connection table, and is used to generate headers for protocol data units associated with the connection. The protocol data unit headers convert the protocol data units into source routed packets that contain path information to enable the packets to be routed through the domain. Traffic from the nodes toward the focal point follow the same path.

According to an embodiment of the invention, the focal node maintains a link state table containing metric information for links and connection reservations through the domain. When a node or link fails, connections carried through the failing node or link are identified, reservations on other links for those connections are released, and the new reservations are made for the connections (if possible) taking into account the new network domain topology.

FIG. 1 illustrates a functional block diagram of a portion of an example communication network. In the following description, it will be assumed that the natural traffic patterns in the network are such that most of the traffic, if not the vast majority of the traffic, will be directed from the nodes to the focal node, and from the focal node outward toward the node. In this situation, performing traffic engineering on the traffic that passes through the focal node may provide significant benefits in the form of alleviating congestion and balancing use of network resources. While there may still be some inter-nodal traffic, that traffic is less likely to be directed to the more heavily used portions of the network and may take place using normal OSPF or other routing protocols. Optionally, intra-nodal traffic may be prohibited, although the invention is not limited in this manner. This may be accomplished in many ways, for example by restricting route distribution on the domain or setting policies on the nodes such that the only routes accepted pass through the focal node. The invention is not limited to a particular policy regarding inter-nodal communications.

One network that tends to naturally emulate a focal-node centric pattern of this nature is in a wireless hotspot network. For example, a wireless network may be formed on an ad-hoc basis by distributing wireless hot spots, configured to communicate using one or more wireless protocols such as one of the 802.11x protocols, 802.16x protocols, or other wireless protocols.

As shown in FIG. 1, a focal node 10 is connected by links 12 to other nodes 14 within domain 16. In the example illustrated in FIG. 1, there is one focal node in domain 16, although the invention is not limited to this particular example. The nodes 14 are connected to each other by links 12 as well to form a mesh within domain 16. The invention is not limited to a mesh topology. The focal node 10 is connected by relatively higher bandwidth resources 18 to a high speed communication resource 20 such as the Internet or Public Switched Telephone Network (PSTN). Other focal nodes 10 provide access to their respective domains 16 as well. The nodes in domain 16 have been provided with reference characters a-k. Focal node F may be considered a node within the domain 16 or may be considered a node on the border of the domain 16.

The nodes in the domain 16 may communicate between each other using one wireless technology and may communicate with end users using another wireless technology. These wireless technologies may be distinguished by frequency or protocol. For example, in one implementation, the communications with end users may take place utilizing the Institute of Electrical and Electronics Engineers (IEEE)

802.11b wireless communication protocol (or one of the other 802.11x protocols). The 802.11b protocol currently enables communications to take place at 11 Mega bits per second (Mbps) at a frequency of 2.4 GigaHertz (GHz). Communications between nodes may take place, in this example, utilizing one of the IEEE 802.16x protocols, the Universal Mobile Telecommunication System (UMTS) wireless communications protocol, the IEEE 802.11a wireless communication protocol, or other emerging protocols such as IEEE 802.18. The 802.11a protocol currently enables communications to take place at 54 Mbps at a frequency of 5 GHz. Other protocols transmitting at other frequencies may be utilized as well and the invention is not limited to this particular example. For example, nodes could also be configured to support the IEEE 802.11g standard, which supports both 802.11a and 802.11b, HiperLAN or Bluetooth.

Although in this application a wireless-based network will be described, and the nodes will be discussed as communicating with each other and with end users using various wireless protocols, the invention is not limited in this regard. Rather, the invention may be used more broadly with other types of communication technology, such as wireline, infra red, acoustic, and numerous other types of communication technology.

The nodes may be connected together in a mesh topology. Specifically, a mesh topology, as that term is used herein, enables many-to-one connectivity to provide a multiplicity of paths through the network. Mesh networks are advantageous in that they enable a given connection to be carried on a number of distinct paths through the network instead of requiring the connection to be carried over one or a limited number of paths through the network. Although this is one possibility, the invention is not limited to a communication network in which the nodes are connected in a mesh topology.

Figure 2:
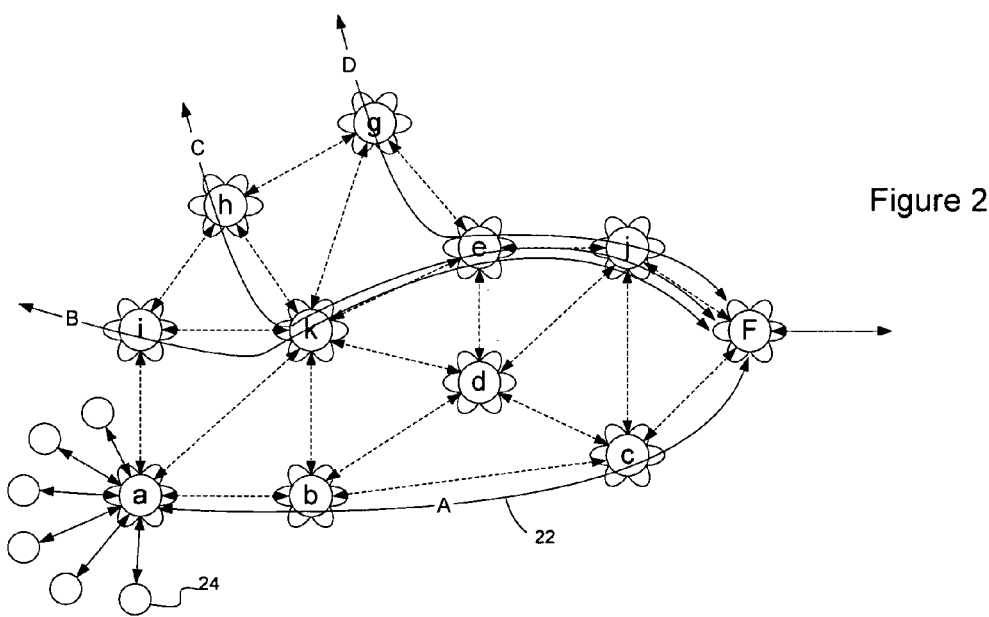
FIG. 2 is a functional block diagram of a portion of a communication network illustrating connections through the communication network.

FIG. 2 is a functional block diagram of a portion of a communication network illustrating connections A-D through the communication network. As shown in FIG. 2, in this example, connections A-D (22) pass through focal node F (10) and then over links 12 and through several of the other nodes 14 to ultimately service end users 24. To prevent a disproportionate amount of traffic from being carried on a particular path on the network, it is desirable to use traffic engineering to more evenly distribute the connections over paths on the network.

As used herein, the term traffic engineering will be used to refer to the process of analyzing network conditions, including metric information associated with the links, and distributing connections on the network to more optimally use the network conditions. As discussed above, traffic engineering is conventionally done by allowing each node in a communication network or domain to build a network topology map and receive link state advertisements indicating connections that have been configured over the links. By maintaining a link state table, the nodes are able to determine metric allocations on the network and hence where congestion is likely to occur on the network, and create new routes through the network to enable communication sessions to take place without using the congested resources.

According to an embodiment of the invention, traffic engineering is performed by the focal node (the source) on behalf of nodes in the domain, and traffic on the domain that is to obtain the benefit of the traffic engineering is routed to pass through the source. Optionally, other traffic that is not subject to traffic engineering may continue to flow between the nodes. However, for traffic that passes through the focal node, it is possible to enable the source to perform traffic engineering on behalf of that traffic and the affected nodes in the domain. Thus, the nodes may take advantage of better engineered flows without maintaining link state tables and distributing link state advertisements to the nodes on the domain. Where the natural traffic patterns result in a large proportion of traffic emanating on or being directed toward the focal node, this can significantly improve traffic conditions on the domain. Additionally, according to an embodiment of the invention, source routed protocol data units are used to transmit data on routes within the domain so that path signaling is not required on the domain since the protocol data units contain information to enable the nodes to directly forward the protocol data unit on the domain.

For intra-nodal traffic, if the focal node determines that the destination address of the traffic is on the local domain it will pass the traffic back onto the local domain along a route from the focal node to the target node. If the destination address is not on the local domain, the focal node will pass the traffic onto the rest of the communication network 20.

Figure 3:
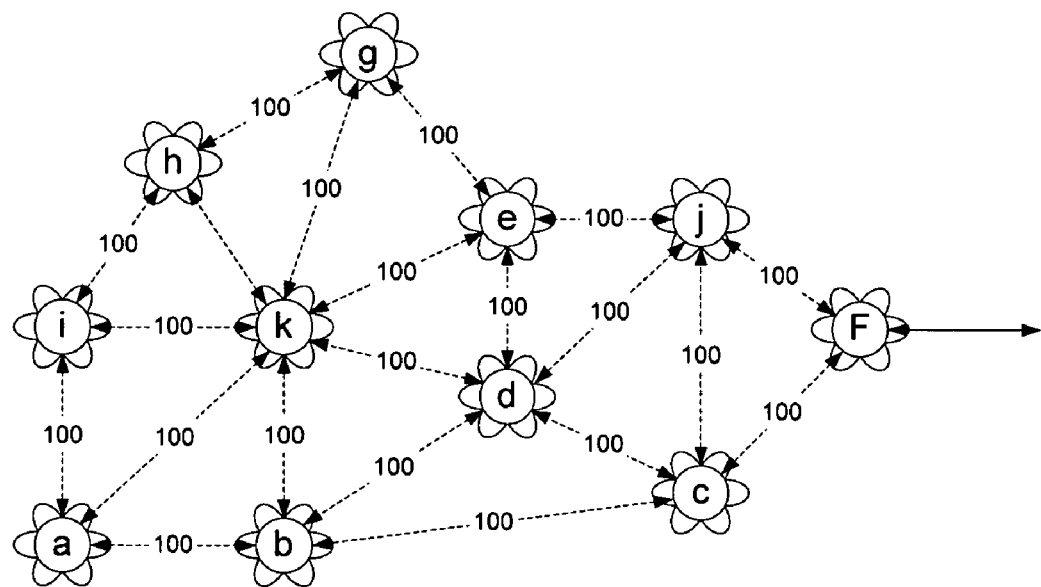
FIG. 3 is an initial link state diagram of the portion of the communication network of FIG. 2.

FIG. 3 illustrates a link state diagram of a portion of the communication network of FIG. 2. As shown in FIG. 3, each of the links in the network are initially approximately equal in nature given the nature of the nodes comprising the domain. Where the domain is configured differently, the actual link values may differ and the values for the links would be determined and input to the link state diagram. The invention is thus not limited to an embodiment in which all the nodes and links are approximately the same and the invention is not limited in this regard.

Initially, the links each have a given metric, such as bandwidth, power, balance, etc. In this example, the metric has been illustrated as being 100 units. These values may take on any units, such as quantity of bandwidth, percentage of capacity, or may remain unitless as described above. The invention is not limited to any particular link metric.

One way to obtain initial link metrics in a domain such as the domain illustrated in FIGS. 1-2, is to run standard OSPF/IS-IS, not OSPF-TE, to obtain a topology database containing raw link speeds without reservation information. OSPF is a standard protocol defined in Internet Engineering Task Force (IETF) Request For Comments (RFC) 2328, the content of which is hereby incorporated herein by reference. OSPF-TE is a standard protocol defined in IETF-RFC 3630, the content of which is hereby incorporated herein by reference.

Figure 4:
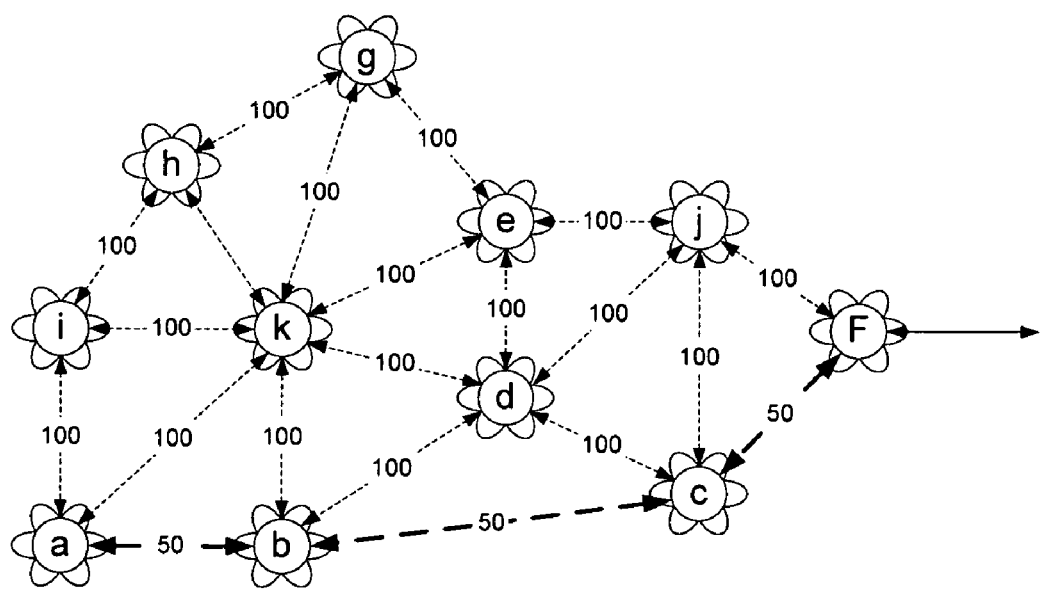
FIG. 4 is a link state diagram of the portion of the communication network of FIG. 2 illustrating a reduction in an associated metric on a given path through the network to accommodate a reservation for a connection over that path.

OSPF returns link speeds and adjacencies in the network to enable the focal node to build a topology database. Once that topology database is built, the focal node starts to build connections through the network and updates the topology database to reflect the link allocations. For example, assume in FIG. 4 that the focal node wishes to allocate bandwidth to a connection A of size 50 units, and that the connection is to extend from the focal node F to node a. In the embodiment illustrated in FIG. 4, there are many ways of getting to node a. The focal node F will choose a path through the network, in this embodiment the path=[c, b, a] and allocate bandwidth on the links between the nodes on that path. Thus, as illustrated in FIG. 4, the available bandwidth on link F-c has been decreased by the amount of metric allocated to the connection which, in this example is 50 units. Similarly, the available metric on link c-b has been decreased by 50 units and the available metric on link b-a has been decreased by 50 units.

While the invention will be discussed in terms of establishing an initial available metric and decrementing the available metric by the amount of reservations allocated to connections over the particular links, the invention is not limited in this regard as other ways of maintaining reservation allocations may be used as well. For example, the focal node may initially set the reserved value on each link to zero and then maintain a table of reservations with a condition that the reserved metric on the link(s) may not exceed predetermined value(s). This may work particularly well in the situation where the links are all of the same size. The invention is not limited to any particular manner of maintaining current available metric values but rather extends to all such embodiments.

Once a connection has been configured on the network by the focal node, data may be forwarded over the connection. For example, when the focal node receives data addressed to node a, it will look into its forwarding tables to determine the connection it has established for node a. If no connection exists it will obtain a connection, if possible, using the procedure discussed above. If the connection exists, the focal node F will determine the route, in this example the route=[c, b, a] and associate the route information with the data. For example, the route information may be included in the header of a packet containing the data. Internet Protocol (IP) headers contain an ability to include multiple destination addresses to thereby enable a path to be defined through the network. Including route information in the protocol data unit header will be referred to as source routing. The focal node will then pass the data onto the network in source-routed protocol data units including the associated route information to cause the data to be forwarded over the route to the target.

The target, upon receipt of a packet of data, will save the routing information to be used to direct traffic back toward the focal node. By maintaining the routing information, the focal node is assured that return data will be forwarded over the path defined through the network by the focal node. This prevents the data from being routed a different way through the network and allows the data to avoid congestion (by taking the reserved path) while also eliminating any requirement that the end node or any intermediate node maintain a link state database. Alternatively, the focal node may establish a separate path for traffic coming from the target node and communicate that path information to the target node so that the target node has an independent path through the network.

Table I illustrates a connection database that may be maintained by the focal node.

TABLE I

| Destination | Metric | Route (header information) |
| --- | --- | --- |
| Node a | 50 | [c, b, a] |
| Node i | 20 | [j, e, k, I] |
| Node h | 30 | [j, e, k, h] |
| Node g | 20 | [j, e, g] |

As shown in Table I, for each destination there is a route, the metric of which is determined by the connections to be carried by that route. Alternatively, each connection may be designated on the network, and more than one connection may be established to the same destination node. The invention is thus not limited to the embodiment illustrated in connection with Table I.

When a target wishes to forward data to the focal node, and no connection has been established through the network, the target may flood a connection request onto the network which will be propagated through the network until it is received at the focal node. Optionally, one or more of the adjacent nodes with a route to the focal node may terminate the flooded connection request and forward it directly to the focal node over its known connection. This may reduce the traffic on the network incident to connection requests.

Upon receipt of a connection request (which could be simply the arrival of a normal IP packet from some node), the focal node will determine if the connection is authorized and, if so, will establish a connection on a path through the network and update its topology database to reflect the new reservation. Where a connection is denied, due to a failed authorization, or an excess of congestion on the network, a connection denial response may be transmitted to the requesting node optionally with an indicia of why the connection was denied. While the system may react to explicit or implicit requests for connections, it may also pro-actively create these connections based on the known topology and expected traffic patterns.

Figure 5:
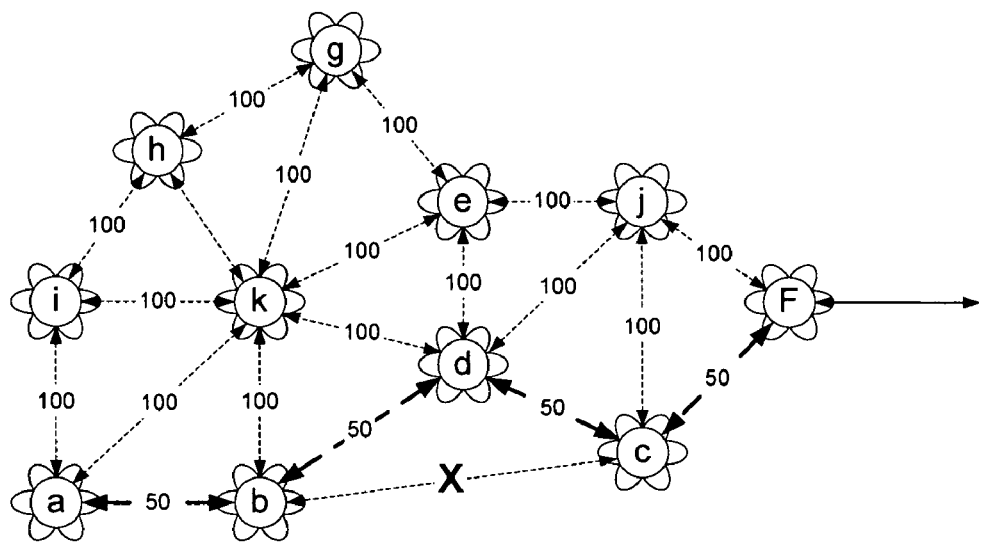
FIG. 5 is a link state diagram of the portion of the communication network of FIG. 2 illustrating a link failure and a reduction in an associated metric on a new path through the network to accommodate a reservation for a connection over that path.
Figure 6:
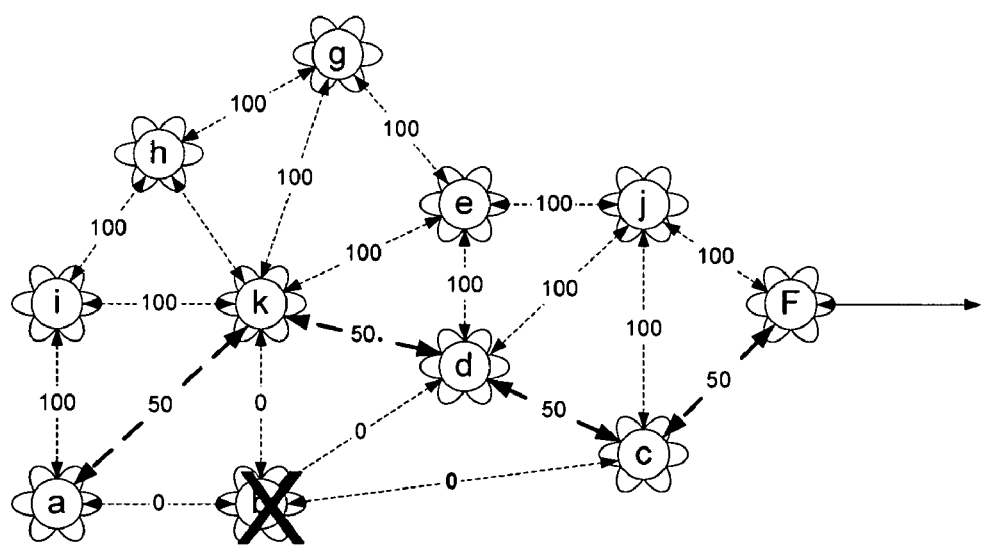
FIG. 6 is a link state diagram of the portion of the communication network of FIG. 2 illustrating a node failure and a reduction in an associated metric on a new path through the network to accommodate a reservation for a connection over that path.

FIGS. 5 and 6 illustrate failures on the network. Specifically, FIG. 5 is a link state diagram of the portion of the communication network of FIG. 2 illustrating a link failure and a reduction in an associated metric on a new path through the network to accommodate a reservation for a connection over that path. Similarly, FIG. 6 is a link state diagram of the portion of the communication network of FIG. 2 illustrating a node failure and a reduction in an associated metric on a new path through the network to accommodate a reservation for a connection over that path.

As shown in FIGS. 5 and 6, when a failure occurs on the network, the failure is detected by the focal node (as described in greater detail below) and the focal node will take actions to reestablish the connections affected by the failure.

For example, assume as illustrated in FIG. 5 that the link between nodes b and c failed for some reason. In a wireless network this may be due to the new presence of a large obstacle, a failed antenna, excessive noise or interference causing the signal to be overly degraded, weather, or any number of other possible failures. When the link fails, and the focal node is notified of the failure, the focal node will determine all connections that are affected by the failure. In the event of a link failure the focal node will determine which connections pass across the link that has failed.

Since these connections will need to be reestablished, the reserved bandwidth for the connections throughout the network is relinquished. For example, in the example discussed above in connection with FIG. 4, a connection of size 50 was established on path [c, b, a]. According to one embodiment, the metrics on the links between nodes a and b, b and c, and c and F, will all be relinquished to increase the available metrics on those links. The focal node will do this with all connections that are affected by the failure on the link. Then, the focal node will start to reestablish the connections through the network. For example, in FIG. 5 the focal node has reestablished connection A through nodes c, d, b, and a. Thus, the new path in this example is [c, d, b, a]. The available metric on the links between the nodes is reduced accordingly in the focal node's topology database and communication between the focal node and target node proceeds as normal.

The target node will need to be informed of the new communication path through the network. There are several ways of doing this. For example, the target node may be configured to check the routing path on incoming data packets against a known routing path and to update its routing path accordingly whenever the routing path changes. This is advantageous in that it enables routing changes to be disseminated quickly on the network without requiring a special protocol exchange between the target node and focal node. Enabling the target node to update its routing path presents a potential security concern, however, for example if a rogue focal point were to start to transmit data to the target node to attempt to intercept traffic from the target node.

Another way of updating the routing information in the target node is to cause the focal node to engage in a protocol exchange with the target node to update the routing information on the target node. The protocol exchange may be relatively simple, for example involving a single message from the focal node to the target node, or may be more complex involving a response-reply exchange involving an exchange of messages between the focal and target nodes. The invention is not limited to one or more of the described protocol exchanges or other types of protocol exchanges on the network.

FIG. 6 illustrates an example in which in which a node has failed on the network. As illustrated in FIG. 6, assume that the node b has failed. Upon detection of the failure, the focal node will determine which connections pass through the failing node and release the metrics or other reservations associated with those connections on the network. A node failure will typically involve more failures than a simple link failure, as more than one link will typically connect to a node. Thus, for example, in the event of a failure of node B, four links are involved: link a-b, link k-b, line d-b, and link c-b. Traffic that is configured to pass over any of these links will need to be reestablished through the network.

There are at least two ways the focal node may determine which connections are affected by the node failure: by determining which connections are on links that go through the failure, or by determining which connections designate the failed node as a hop on the network. In either instance, the focal node will make new computations for the affected paths. The resulting source routes are then installed in the forwarding table on the focal point and used. These new source routes will then be received by the various destinations in a reversed format, thus informing the destination of the new route back to the focal point.

Once the connections have been determined and the reservations associated with those connections have been relinquished, the focal node will reestablish connections through the network. The focal node may reestablish all connections or may wait until traffic is received for the connection. In either instance, the focal node will make new reservations for the connections and re-provision the connections through the network. In the example illustrated in FIG. 6, the original connection [c, b, a] is changed to [c, d, k, a] and bandwidth is reserved on the links between these nodes. Connections may be established and reestablished serially, in groups, or all together depending on the implementation of the focal node.

Node failure and link failure may cause one or more connections on the network to be unrestorable. Specifically, the connection may have its target node as the failing node or, alternatively, the only available path through the network may require the path to traverse the failed node or link. According to one embodiment of the invention, the focal node determines, prior to attempting to restore the connection or at the time it attempts to restore the connection, whether the connection is restorable. If the connection is not restorable, an appropriate entry is made in the forwarding table and traffic received by the focal node and intended to be transmitted over the unrestorable connection will be dropped.

Where the failing node is the focal node, if a redundant focal node has been configured on the network, the redundant focal node will assume responsibility for managing connections on the network, tear all of the connections down, and reestablish connections in a manner as described above. Optionally, the secondary paths/routes through the network may be maintained in a separate database so that, upon focal node failure, the secondary focal node may be ready to handle communications on the network without requiring a start-up period for reestablishing the connections on the network. Where there is no secondary focal node, communications on the domain will be suspended until the focal node is restored.

When a link or node is restored on the network, the focal node may start to provision connections through the newly restored link or node. The connections through that node may be established as new connections are added to the network. Optionally, connections that are already established on the network may be torn down and reestablished if the new path for the connection through the newly restored link/node would be more desirable. Many different ways of optimizing and selecting optimal routes through the network may be utilized to resolve on a set of connections that best utilizes the network resources and minimizes congestion.

While several of the embodiments of this application have focused on addition of a connection to the network, the invention is not limited in this regard as many other functions may be performed as well. For example, where a user is moving on the network and/or one of the nodes in the network is mobile, it may be desirable to redistribute routes through the network or to periodically select a more desirable set of routes on the network. Accordingly, in one embodiment of the invention, route allocation may be optimized by the reestablishment of routes on the network, such as through the addition of one or more connections and deletion of another one or more connections, to thereby effect new path allocations to the nodes and users.

Figure 7:
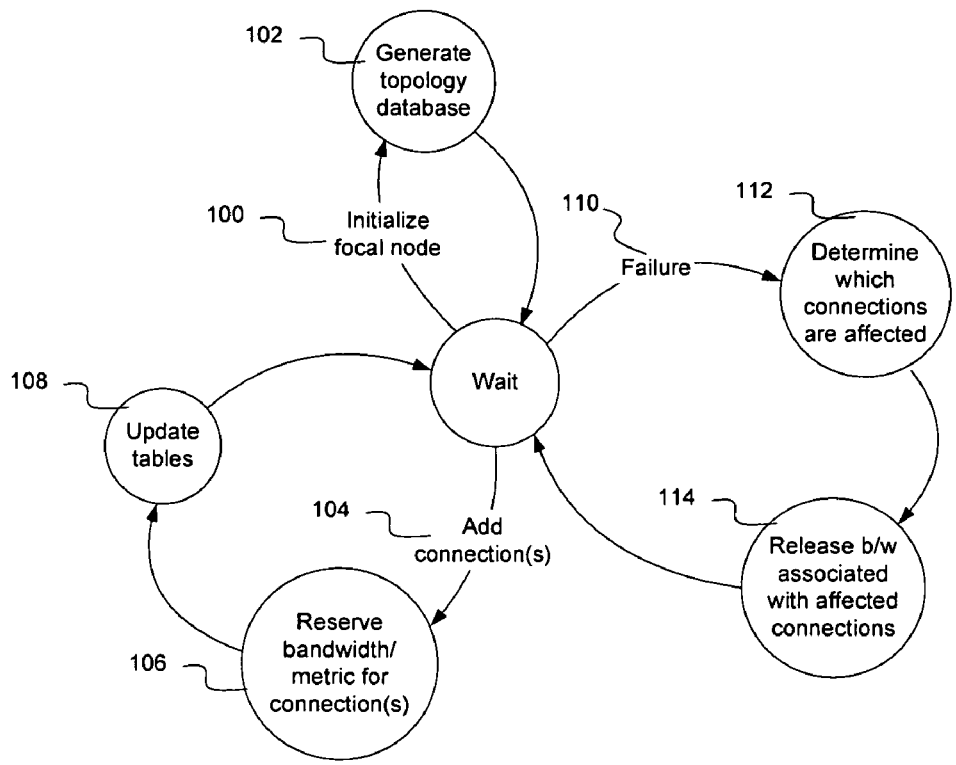
FIG. 7 is a state diagram illustrating an example of how a network element may implement the establishment and maintenance of connections on the network.

FIG. 7 illustrates a state diagram illustrating an example of how a network element may establish and maintain connections on the network. Specifically, as shown in FIG. 7, when it is necessary to initialize the focal node 100, for example where the focal node is added to the network or becomes designated as the primary focal node due to failure of another focal node, the focal node will generate a topology database 102 and return.

If one or more connection(s) are to be added 104, the focal node will reserve bandwidth or other metric for the connection(s) on the network 106, update its tables 108, and return. Since the focal node is in charge of metric provisioning for traffic that flows through it on the network, reserving bandwidth or other metric on the network for the connection may be a relatively simple process. For example, the bandwidth/metric may be reserved on the network for the connection by decrementing the available bandwidth/metric on particular links for the new connection and storing that allocation in a table so that the bandwidth/metric is not able to be allocated to other connections (assuming no over-provisioning).

If there is a failure on the network 110, the focal node will determine which connections are affected 112, release bandwidth/metric associated with those affected connections 114, and return. Optionally, the focal node may immediately initiate an add connection procedure to reestablish the connection on the network. Alternatively, the node may wait until traffic for the connection is received or a request for a connection from the target is received and enter the add connection procedure at that point in time.

Link failure detection may rely on OSPF link state advertisements to flood the link failure to the focal node. Alternatively, the link failure messages may be configured to propagate always away from the failure point and only toward the focal point. Using this failure message to detect network failures may provide a faster failure detection message than standard link state advertisements in OSPF.

Optionally, the focal node may include alternative paths pre-computed for each possible failure on the network for each connection. For example, assume a connection [c, b, a]. The focal node may include, in its tables, a set of routes to use in the event of a failure of a link or node on this connection. Since connection [c, b, a] includes three links and two nodes intermediate the end points, the table in this example could include five alternative routes through the network so that, in the event of a failure of one of the links or nodes, the alternative path could automatically be used for the connection without requiring the connection to be re-established on the network. The combination of accelerated failure detection, discussed above, and pre-computed paths may provide relatively fast failure recovery for connections on the network.

In the above description OSPF has been described as a protocol that may be used to implement one embodiment of the invention. The invention is not limited to OSPF, however, as other link state protocols may also be used (e.g. Intermediate System to Intermediate System (IS-IS). Additionally, the invention may be used in connection with IP source routing or any other routing protocol that enables a hop list to be contained in the header or elsewhere in the protocol data unit. The hop list may be absolute or relatively specified or defined in another manner without departing from the scope of the invention.

Figure 8:
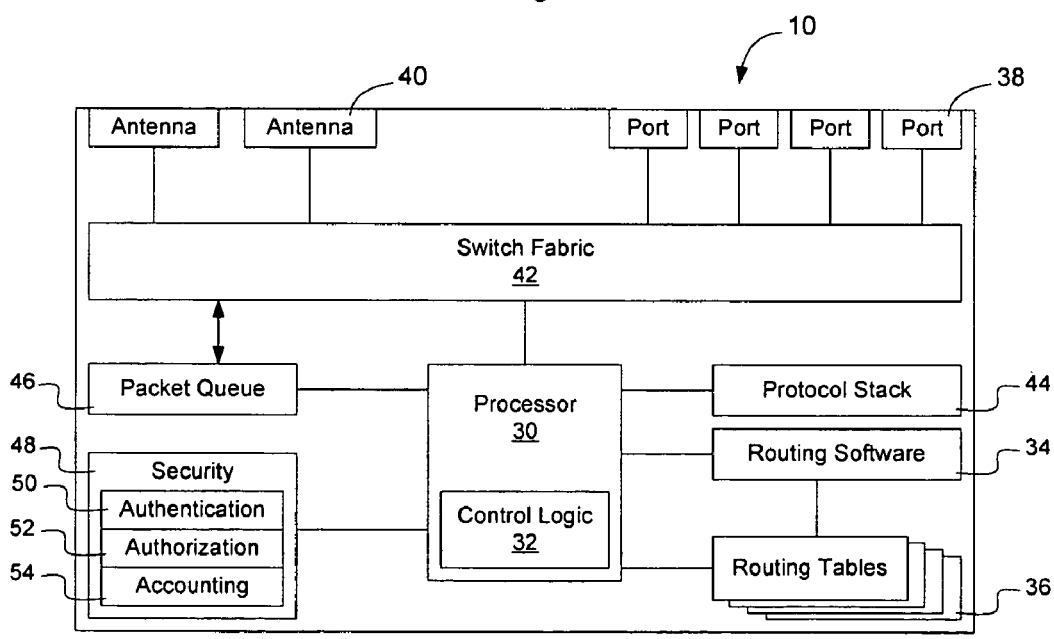
FIG. 8 is a functional block diagram of a focal node according to an embodiment of the invention.

FIG. 8 is a functional block diagram of a focal node configured to implement an embodiment of the invention. The embodiment illustrated in FIG. 5 is a wireless focal node having wireless antennae configured to enable the focal node to communicate using one or more wireless protocols. The invention is not limited to this embodiment as a wireline device may be used as well.

As shown in FIG. 8, the focal node 10 generally includes a processor 30 containing control logic 32 configured to perform functions described to enable the focal node to allocate routes through the constrained domain. The processor may interface routing software 34 and routing tables 36 to enable it to perform the functions described above in connection with FIGS. 1-7.

The network element may be provided with one or more components (hardware and/or software) to enable it to communicate on a communication network. In the embodiment illustrated in FIG. 8, the network element includes a plurality of network ports 38 and antennae 40 to enable the focal node to communicate using both wireline and wireless technologies. The invention is not limited to one or more specific types of communication technology.

The various interfaces (wireless and wireline) may be connected to a switch fabric 42 that operates under the control of the processor 30. A protocol stack 44 containing data and instructions configured to enable the focal node to participate in protocol exchanges on the network may optionally be included. Other conventional network element features, such as a packet queue 46 configured to temporarily store protocol data units for transmission on the network, may also be included. Additionally, the focal node may include a security module 48 containing an authentication module 50 configured to authenticate users, devices, or connections on the network, an authorization module 52 configured to determine appropriate authorization control information to prevent unauthorized access to the network, and an accounting module 54 configured to enable accounting entries to be established for communication sessions on the network. Other modules may be included as well and the invention is not limited to a particular implementation of the network device.

The functions described above may be implemented as a set of program instructions that are stored in a computer readable memory within the network element and executed on one or more processors within the network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of performing constraint based routing on a communication network, the method comprising the steps of:
   obtaining information relating to a topology of the communication network by at least one focal node on the communication network;
   maintaining a constraint table by the focal node, the constraint table containing metrics of links and connection reservations through the communication network;
   using the constraint table by the focal node to determine a plurality of traffic engineered paths for a plurality of connections to be implemented on the communication network, each of the plurality of traffic engineered paths extending between the focal node and other nodes on the communication network; and
   causing all traffic subject to traffic engineering to pass through the focal node prior to being passed onto the communication network, to enable the focal node to add source routing information to the traffic subject to traffic engineering before passing the traffic subject to traffic engineering onto the communication network so that the focal node can cause the traffic subject to traffic engineering to follow the determined plurality of traffic engineered paths on the communication network without requiring dissemination of path reservations for the traffic engineered paths on the communication network.

2. The method of claim 1, further comprising the steps of receiving indications of a failure on the communication network, and updating the constraint table.

3. The method of claim 2, wherein the step of updating the constraint table comprises releasing resources allocated to connections established on traffic engineered paths that pass through the failure, and reallocating resources for the connections on new traffic engineered paths through the communication network.

4. The method of claim 1, wherein the step of maintaining a constraint table further comprises maintaining alternative traffic engineered paths for use by connections in the event of one or more failures on the communication network.

5. The method of claim 1, wherein the source routed protocol data units contain a hop list of nodes on the communication network.

6. The method of claim 5, wherein the hop list contains a list of node IDs.

7. The method of claim 5, wherein the hop list contains a list of next hops.

8. The method of claim 1, wherein each of the source routed protocol data units contains a list of hops or links defining the traffic engineered path through the network for the connection from the focal node to a target node.

9. The method of claim 8, wherein an inverse of the list of hops or links may be used by the target node as a route to the focal node.

10. A focal node, comprising:

a processor comprising control logic configured to compute traffic engineered routes by maintaining a constraint table reflecting connections on a domain, making constraint based routing decisions on behalf of nodes on the domain, and making reservations for connections on the domain by updating the constraint table with metric reservation information for the connections without signaling the reservations for the connections on the domain, the domain comprising a group of network nodes configured to communicate on traffic engineered routes that pass through the focal node; and a routing module implemented by the focal node and configured to generate source route headers for application to packets for transmission of the packets over the computed traffic engineered routes on the domain, such that all traffic subject to traffic engineering which is intended to be transmitted to one or more of the group of network nodes on the domain passes through the focal node and receives a source route header corresponding to a respective traffic engineered route prior to being transmitted onto the domain so that the traffic subject to traffic engineering will be transmitted over the traffic engineered routes computed by the focal node.

11. The focal node of claim 10, wherein the control logic is further configured to release metric reservations for connections affected by a failure on the domain by updating the constraint table.

12. The focal node of claim 11, wherein the control logic is further configured to reestablish the connections affected by the failure on the domain by making new constraint based routing decisions for the connections affected by the failure.

13. The focal node of claim 12, wherein the new constraint based routing decisions are made before the failure.

14. The focal node of claim 10, further comprising a plurality of network ports configured to interface links on the network and a switch fabric configured to interconnect the network ports under the control of the processor.

15. The focal node of claim 10, further comprising at least one wireless network port.

16. The focal node of claim 10, further comprising a security module, said security module configured to perform authentication, authorization, and accounting processes for the focal node.

* * * * *

UNITED STATES PATENT AND TRADEMARK OFFICE
CERTIFICATE OF CORRECTION

PATENT NO. : 7,643,467 B2 Page 1 of 1
APPLICATION NO. : 10/745886
DATED : January 5, 2010
INVENTOR(S) : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1056 days.

Signed and Sealed this

Sixteenth Day of November, 2010

David J. Kappos
*Director of the United States Patent and Trademark Office*